(12) United States Patent
Dwivedi et al.

(10) Patent No.: US 11,800,474 B2
(45) Date of Patent: Oct. 24, 2023

(54) METHODS, SECOND NODE AND APPARATUS FOR DETERMINING CLOCK ASYNCHRONIZATION

(71) Applicant: Telefonaktiebolaget LM Ericsson (publ), Stockholm (SE)

(72) Inventors: Satyam Dwivedi, Sollentuna (SE); Fredrik Gunnarsson, Linkoping (SE); Avneesh Vyas, Sundbyberg (SE); Magnus Sandgren, Staffanstorp (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 474 days.

(21) Appl. No.: 17/278,522

(22) PCT Filed: Sep. 27, 2018

(86) PCT No.: PCT/SE2018/050990
§ 371 (c)(1),
(2) Date: Mar. 22, 2021

(87) PCT Pub. No.: WO2020/067941
PCT Pub. Date: Apr. 2, 2020

(65) Prior Publication Data
US 2022/0039042 A1     Feb. 3, 2022

(51) Int. Cl.
*H04W 56/00*     (2009.01)

(52) U.S. Cl.
CPC ..... *H04W 56/0035* (2013.01); *H04W 56/001* (2013.01)

(58) Field of Classification Search
CPC ............. H04W 56/0035; H04W 56/00; H04W 56/001; H04W 56/0005; H04W 56/003; H04W 56/004; H04W 56/0055
See application file for complete search history.

(56) References Cited

U.S. PATENT DOCUMENTS

2008/0198836 A1     8/2008     Sun
2016/0249165 A1*    8/2016     Aldana ................ H04W 64/00
(Continued)

FOREIGN PATENT DOCUMENTS

CN    108139474 A   *   6/2018   ........... B64C 39/024
CN    106375055 B   *   9/2018   ........... H04J 3/0658
(Continued)

OTHER PUBLICATIONS

International Search Report and Written Opinion dated Jun. 13, 2019 for International Application No. PCT/SE2018/050990 filed Sep. 27, 2018, consisting of 13-pages.
(Continued)

*Primary Examiner* — Phong La
(74) *Attorney, Agent, or Firm* — Christopher & Weisberg, P.A.

(57) ABSTRACT

Methods and apparatuses for determining asynchronization between a first clock used by a first node (N1) and a second clock used by a second node (N2). A sequence of time differences is measured based on a sequence of signals periodically sent by the second node (N2) and received by the first node (N1), wherein each time difference of a signal is between a respective transmission timestamp in accordance with the second clock and a respective receiving timestamp in accordance with the first clock; and at least one of a relative phase offset or a relative frequency offset between the first and the second clock is estimated based on the sequence of time differences.

14 Claims, 6 Drawing Sheets

(56) References Cited

U.S. PATENT DOCUMENTS

2018/0041329 A1* 2/2018 Wang ................ H04W 56/0035
2020/0314752 A1* 10/2020 Haque ............... H04W 52/0216
2022/0039042 A1* 2/2022 Dwivedi ............. H04W 56/001

FOREIGN PATENT DOCUMENTS

CN 109525349 A * 3/2019 ............ H04J 3/0641
WO WO-2017155634 A1 * 9/2017 ........... A61B 5/0507

OTHER PUBLICATIONS

Satyam Dwivedi et al.; Joint Ranging and Clock Parameter Estimation by Wireless Round Trip Time Measurements; IEEE Journal on Selected Areas in Communications; Nov. 2015; pp. 2379-2390; vol. 33, No. 11, consisting of 12-pages.
Maciej Lipinski et al.; White Rabbit: a PTP Application for Robust Sub-nanosecond Synchronization; IEEE; Nov. 2011; consisting of 6-pages.
Precision time protocol telecom profile for phase/time synchronization with full timing support from the network; Series G: Transmission Systems and Media, Digital Systems and Networks; Packet over Transport aspects-Synchronization, quality and availability targets; Series Y: Global Information Infrastructure, Internet Protocol Aspects and Next-Generation Networks, Internet of Things and Smart Cities; Recommendation ITU-T G.8275.1/Y.1369.1; IEEE; Jun. 22, 2016, consisting of 56-pages.
Heng Wang et al.; Estimation of Frequency Offset for Time Synchronization With Immediate Clock Adjustment in Multihop Wireless Sensor Networks; IEEE Internet of Things Journal; Dec. 22017; pp. 2239-2246; vol. 4 No. 6, consisting of 8-pages.

* cited by examiner

METHODS, SECOND NODE AND APPARATUS FOR DETERMINING CLOCK ASYNCHRONIZATION

CROSS-REFERENCE TO RELATED APPLICATIONS

This application is a Submission Under 35 U.S.C. § 371 for U.S. National Stage Patent Application of International Application Number: PCT/SE2018/050990, filed Sep. 27, 2018 entitled "METHODS, SECOND NODE AND APPARATUS FOR DETERMINING CLOCK ASYNCHRONIZATION," the entirety of which is incorporated herein by reference.

TECHNICAL FIELD

Embodiments herein relate to methods, a second node and an apparatus for determining clock asynchronization. Furthermore, corresponding computer program products and computer-readable storage media are also disclosed. In particular, embodiments herein relate to the methods, the apparatus and the second node for determining clock asynchronization between a first clock used by a first node and a second clock used by the second node.

BACKGROUND

A common time reference among nodes is a key requirement of communication networks, distributed control systems, factory automation systems, financial networks, Internet-of-things (IoT) systems, machine-to-machine (M2M) systems, or similar scenarios. Further, many coordinated functions such as wireless positioning, carrier aggregation, and Coordinated Multipoint (CoMP) Distributed Beamforming are putting more and more time precision requirements, often in the order of nanoseconds. Achieving high precision is challenging with existing clock synchronization techniques. Therefore, improved techniques are needed to improve the time precision of the existing clock synchronization techniques.

Ideally, all nodes are supposed to use the same time reference so as to enable full clock synchronization between the nodes. The same time reference means the same phase and frequency. The nodes may normally have a hardware based clock that counts oscillations of a crystal. This type of hardware clock is used by the node's software clock to track the current time. When each node in a network uses one and the same clock reference, it means that two clocks used by two nodes are synchronized by having the same phase and frequency. In practice, different clocks are often used which are not completely synchronized due to either a different phase or a different frequency, which is called clock asynchronization. For instance, the hardware clock may be subject to drift, i.e., the clock's frequency varies more or less randomly and the time indicated by that clock becomes inaccurate. As a result, any two clocks and the times they indicate are likely to be slightly different, i.e. unsynchronized, at any given time. In order to detect the clock asynchronization, two nodes may exchange signals based on their clocks.

Clock synchronization in communication networks enables many services including assisted navigation, location, and emergency calls. Moreover, synchronization between entities in a wireless or cellular network is fundamental, otherwise the entities would not even work properly. For instance, base stations frequently need to determine the distance to mobile terminals operating in their cells and in neighbouring cells, based on timing of received signals. The base stations and mobile terminals also have to precisely follow the same scheme of transmission time-slots. To maintain synchronization between the base stations and the mobile terminals is therefore vital.

There are well established synchronization protocols such as Precision Time Protocol (PTP), Network Time Protocol (NTP), and Synchronous Ethernet (SyncE) which use periodic one-way signalling to enable frequency synchronization between independent clocks to varying degrees of accuracy. But none of these protocols recognize relative clock phase offset between master and slave. Neglecting phase offset introduces a worst-case phase error equivalent to the time period of the slave clock used by each measurement sample. For example, 8 ns worst-case phase error in a 125 MHz Ethernet. The phase error is higher when synchronizing low frequency clocks.

The phase error is one of the most dominant error sources that constraint the current state-of-art time synchronization methods from reaching sub-nanosecond accuracy. Measuring phase error is hard and often involves non-trivial hardware solutions such as high frequency timestamping units and phase detector circuits.

Therefore the following existing clock synchronization techniques which can estimate the phase offset have been developed.

Ref [1]: Dwivedi, S., De Angelis, A., Zachariah, D., & Händel, P. (2015). Joint ranging and clock parameter estimation by wireless round trip time measurements. IEEE Journal on Selected Areas in Communications, 33(11), 2379-2390, has devised a Round Trip Time (RTT) based technique to precisely estimate clock parameters between two nodes without any timestamp exchange. Here, RTTs have been shown to follow a time varying periodic sawtooth waveform. This sawtooth waveform results from a relative clock phase offset Ø and a relative frequency offset $f_d$ between two nodes. Ref [1] discloses how values of the relative clock phase offset Ø and a relative frequency offset $f_d$ are mathematically estimated from the sawtooth waveform.

Ref [2]: Lipiński, M., Włostowski, T., Serrano, J., & Alvarez, P. (2011, September). White rabbit: A PTP application for robust sub-nanosecond synchronization. In Precision Clock Synchronization for Measurement Control and Communication (ISPCS), 2011 International IEEE Symposium on (pp. 25-30), has succeeded in reaching sub-nanosecond accuracy through PTP running on SyncE. While SyncE provides frequency sync between two nodes, Ref [2] uses hardware phase detector technologies to measure relative phase difference between the two clocks. The measured phase difference is then used by respective nodes to improve the precision of asynchronous PTP timestamps.

However the above existing clock synchronization techniques which can estimate the phase offset still have various technical problems and shortcomings. It is thus desirable to improve the technique for determining clock asynchronization.

SUMMARY

It is therefore an object of embodiments herein to provide improved methods and nodes for determining clock asynchronization, thereby enabling more precise clock synchronization.

According to one aspect, the object is achieved by a method for determining asynchronization between a first clock used by a first node and a second clock used by a second node. The method comprises measuring a sequence of time differences based on a sequence of signals periodically sent by the second node and received by the first node. Each time difference of a signal is between a respective transmission timestamp in accordance with the second clock and a respective receiving timestamp in accordance with the first clock. The method further comprises estimating at least one of a relative phase offset or a relative frequency offset between the first and the second clock based on the sequence of time differences.

According to another aspect, the object is achieved by a method performed by a second node for facilitating a determination of asynchronization between a first clock used by a first node and a second clock used by a second node. The method comprises: periodically sending a sequence of signals to the first node, to facilitate the first node to measure a sequence of time differences based on a sequence of signals, wherein each time difference of a signal is between a respective transmission timestamp in accordance with the second clock and a respective receiving timestamp in accordance with the first clock; and to facilitate the first node to estimate at least one of a relative phase offset or a relative frequency offset between the first and the second clock based on the sequence of time differences.

According to still another aspect the object is achieved by providing an apparatus for determining asynchronization between a first clock used by a first node and a second clock used by a second node. The apparatus is configured to measure a sequence of time differences based on a sequence of signals periodically sent by the second node and received by the first node. Each time difference of a signal is between a respective transmission timestamp in accordance with the second clock and a respective receiving timestamp in accordance with the first clock. The apparatus is further configured to estimate at least one of a relative phase offset or a relative frequency offset between the first and the second clock based on the sequence of time differences.

According to still another aspect the object is achieved by providing a second node for facilitating a determination of asynchronization between a first clock used by a first node and a second clock used by a second node. The second node is configured to periodically send a sequence of signals to the first node, to facilitate the first node to measure a sequence of time differences based on a sequence of signals, wherein each time difference of a signal is between a respective transmission timestamp in accordance with the second clock and a respective receiving timestamp in accordance with the first clock; and to facilitate the first node to estimate at least one of a relative phase offset or a relative frequency offset between the first and the second clock based on the sequence of time differences.

It is furthermore provided herein a computer program product comprising instructions, which, when executed on at least one processor, cause the at least one processor to carry out any of the methods above, as performed by the apparatus or the second node. It is additionally provided herein a computer-readable storage medium, having stored thereon a computer program product comprising instructions which, when executed on at least one processor, cause the at least one processor to carry out the method according to any of the methods above, as performed by an apparatus or the second node.

According to still another aspect the object is achieved by providing an apparatus comprising processing circuitry configured to measure a sequence of time differences based on a sequence of signals periodically sent by a second node and received by a first node. Each time difference of a signal is between a respective transmission timestamp in accordance with a second clock used by the second node and a respective receiving timestamp in accordance with the first clock used by the first node. The processing circuitry is further configured to estimate at least one of a relative phase offset or a relative frequency offset between the first and the second clock based on the sequence of time differences.

According to still another aspect the object is achieved by providing a second node comprising processing circuitry configured to periodically send a sequence of signals to a first node, to facilitate the first node to measure a sequence of time differences based on a sequence of signals, wherein each time difference of a signal is between a respective transmission timestamp in accordance with a second clock used by the second node and a respective receiving timestamp in accordance with the first clock used by the first node; and to facilitate the first node to estimate at least one of a relative phase offset or a relative frequency offset between the first and the second clock based on the sequence of time differences.

Since the estimating of the relative clock phase and/or frequency offset only requires signals sent by the second node and received by the first node, instead of any additional responses to the second node, low bandwidth for determining the clock synchronization is needed. Additionally, the embodiments herein are applicable to any signals, not limited to any specific protocol, therefore the embodiments are compatible to any existing system. Moreover, the embodiments herein do not require any additional hardware, therefore they can be seamlessly applied to any existing clock synchronization techniques and improve the precision thanks to the estimated relative clock phase offset.

BRIEF DESCRIPTION OF THE DRAWINGS

Examples of embodiments herein are described in more detail with reference to attached drawings in which.

DETAILED DESCRIPTION

As part of developing embodiments herein, technical problems in the existing clock synchronization techniques which can estimate the phase error will first be identified and shortly discussed.

The methods according to both Ref [1] and Ref [2] require round trip signals, and therefore require higher bandwidth.

Moreover, the method according to Ref [2] even requires specialized phase measurement hardware and transport technology.

The embodiments described herein enable a precise determination of phase and frequency offsets between two clocks used by two nodes, respectively. Round trip signals are two-way signals and the embodiments herein use only one-way signals from one node to the other node. In other words, the embodiments herein only require the signals transmitted from one node to the other, and do not require that the node receiving the signals returns any response signals to the signal transmitting node. The embodiments herein therefore require lower bandwidth.

The embodiments herein are not limited in terms of where the clocks are located. For instance, the clock may be an internal clock comprised within a node, on the other hand, the clock may also be an external one in a cloud and used by a node.

Figure 1:
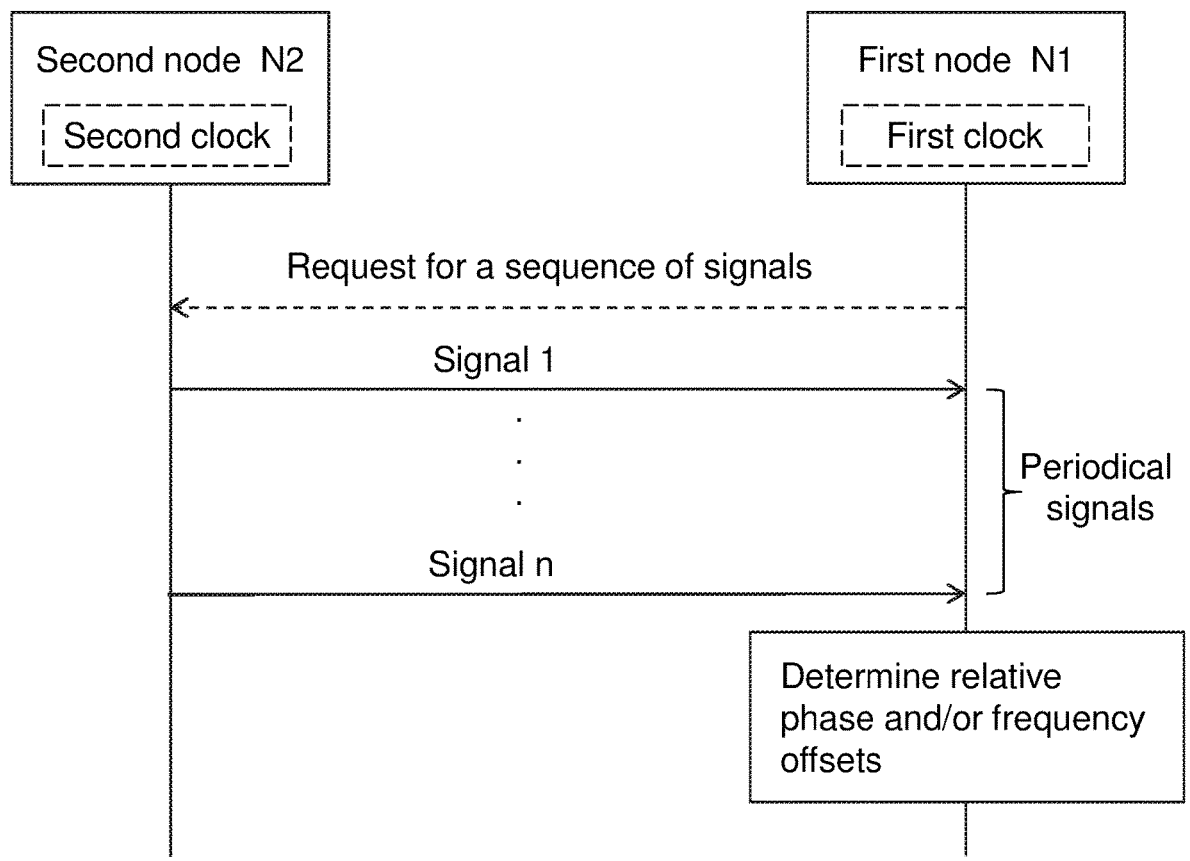
FIG. 1 is a signalling scheme according to some embodiments herein.

FIG. 1 depicts a signalling scheme between a first node N1 and a second node N2 according to embodiments herein. FIG. 1 shows a single first node N1 and a single second node N2, but embodiments also apply to single second node N2 and a plurality of first nodes Nis. For instance, in case that the signals are multicast or broadcasted, each involved first node may perform the same actions as the first node N1 described herein. A first clock is used by the first node N1 and a second clock is used by the second node N2. The signaling in FIG. 1 may be used to determine asynchronization between the first clock and the second clock.

The first node N1 may initially send a request to the second node N2 requesting to receive a sequence of signals from the second node N2. Upon reception of the request, the second node N2 may periodically send signals to the first node N1. The signals may be sent as unicast, multicast or broadcast sequence of signals. Based on reception of the signals, the first node N1 determines the phase and/or frequency offset between the two clocks. Normally it is a slave node that synchronizes its clock with a clock used by a master node, sometimes, however, the synchronization is also performed in dual-direction, i.e., the master node also synchronizes its clock to the clock used by the slave node. Therefore the first node N1 may be either a slave node, or a master node.

The embodiments herein may be applied to a wireless communication network. The first and second nodes N1, N2 may use a wireless communication technique to communicate with each other. For instance, the first node N1 may be a wireless device, and the second node N2 may be a network node, or vice versa. Alternatively, both the first and second nodes N1, N2 may be network nodes. As a further example, the first and second nodes N1, N2 may be two wireless nodes or two IoT nodes. More details about the network node, wireless device and IoT node will be provided below.

The network node operating in a wireless communication network may use any radio, cellular or wireless communication technology to communicate with the wireless device, such as LTE, e.g., LTE Frequency Division Duplex (FDD), LTE Time Division Duplex (TDD), LTE Half-Duplex Frequency Division Duplex (HD-FDD), LTE operating in an unlicensed band, or a Wideband Code Division Multiple Access (WCDMA), Universal Terrestrial Radio Access (UTRA TDD), Ultra-Mobile Broadband (UMB), Global System for Mobile communications (GSM) network, GSM/Enhanced Data Rate for GSM Evolution (EDGE) Radio Access Network (GERAN) network, EDGE network, a network comprising of any combination of Radio Access Technologies (RATs), e.g., Multi-Standard Radio (MSR) base stations, multi-RAT base stations etc., any 3rd Generation Partnership Project (3GPP) cellular network, W-Fi networks, Worldwide Interoperability for Microwave Access (WiMAX), 5 Generation (5G) or New Radio (NR) system or any cellular network or system. Radio communications use ElectroMagnetic (EM) waves that travel through the air.

The term network node refers to equipment capable, configured, arranged and/or operable to communicate directly or indirectly with the wireless device and/or with other network nodes or equipment in the radio communication network to enable and/or provide wireless access to the wireless device and/or to perform other functions e.g., administration in the wireless network. Examples of network nodes include, but are not limited to, access points APs e.g., radio access points, base stations (BSs), e.g., radio base stations, Node Bs, evolved Node Bs (eNBs) and new radio (NR) NodeBs gNBs. Base stations may be categorized based on the amount of coverage they provide or, stated differently, their transmit power level and may then also be referred to as femto base stations, pico base stations, micro base stations, or macro base stations. A base station may be a relay node or a relay donor node controlling a relay. A network node may also include one or more or all parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes e.g., mobile switching centres (MSCs), Mobility Management Entities (MMEs), Operation and Maintenance (O&M) nodes, Operations support system (OSS) nodes, Self-Organizing Network (SON) nodes, positioning nodes e.g., Evolved Serving Mobile Location Centres (E-SMLCs). As another example, a network node may be a virtual network node as described in more detail below. More generally, however, network nodes may represent any suitable device or group of devices capable, configured, arranged, and/or operable to enable and/or provide a wireless device with access to the wireless network or to provide some service to a wireless device that has accessed the wireless network. Unless otherwise noted, the term network node may be used interchangeably herein with base station.

As used herein, the term wireless device refers to a device capable, configured, arranged and/or operable to use any one of the different RATs to communicate wirelessly with the network node and/or with other wireless devices. The wireless device is served by the network node using a RAT. Communicating wirelessly may involve transmitting and/or receiving wireless signals using electromagnetic waves, radio waves, infrared waves, and/or other types of signals suitable for conveying information through air. It should be understood by those skilled in the art that "wireless device" is a non-limiting term which means any terminal, wireless communication terminal, communication equipment, Machine Type Communication (MTC) device, Device to Device (D2D) terminal, a mobile station, a non-access point (non-AP) station (STA), a STA or user equipment e.g., smart phone, laptop, mobile phone, sensor, relay, mobile tablets or any device communicating within a cell or service area.

The IoT nodes may be physical devices, vehicles, home appliances and other items embedded with electronics, software, sensors, actuators, and connectivity which enable these objects to connect and exchange data.

The embodiments herein may also be applied to wired communication, e.g., a computer network. The wired communication may also be called a packet-switched network, or packet network, e.g. an Ethernet, a SyncE or an IP network. The first and second nodes N1, N2 may be two nodes operable to perform packet switching. For instance, the first and second nodes N1, N2 may be any one of a router, a switch, a mobile switch, a computer, a radio base station connected via wired or wireless connection.

Figure 2:
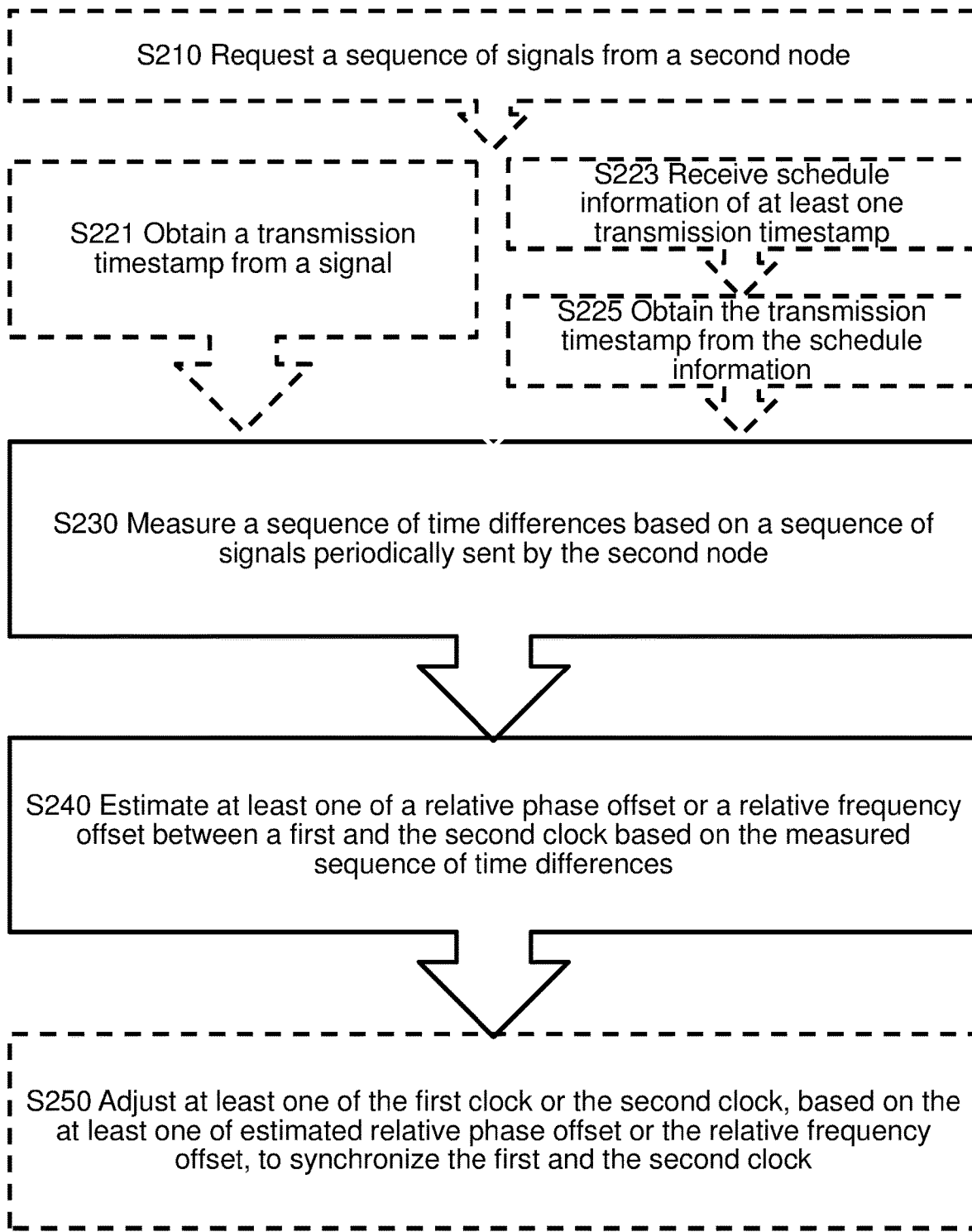
FIG. 2 is a flowchart depicting actions that may be performed by an apparatus according to further embodiments herein.

FIG. 2 is a flowchart describing an exemplary method for determining asynchronization between the first clock used by the first node N1 and the second clock used by the second node N2. The actions may be performed by an apparatus, such as the first node N1 or some other third node. The following actions may be taken in any suitable order. Actions that could be performed only in some embodiments may be marked with dashed boxes.

Action S210. The first node N1 may send to the second node N2, a request requesting for a sequence of signals from the second node N2. The first node N1 may then receive a sequence of signals periodically sent by the second node N2. The periodically sent signals refer to signals which are sent over a time interval. Sending of the signals may be performed at a certain minimum rate, wherein the certain minimum rate may be of a value, which value may depend upon available bandwidth and maximum expected frequency difference between the two clocks.

The signals used herein may include any transmissions, such as synchronization signals or reference signals, PTP messages or SyncE messages, between the two nodes N1, N2. Taking PTP message as an example, the signal may be any one of: a Sync, Follow up (Follow_up), Delay request (Delay_Req) and Delay response (Delay_Resp). The PTP messages may be transported by using an Ethernet, a Synchronous Ethernet (SyncE) or a User Datagram Protocol over Internet Protocol (UDP/IP).

The signals according to embodiments herein may be transmitted in any form, e.g., unicast, multicast or broadcast. When the signals are broadcast signals, a further technical benefit is that it may enable more nodes to determine the asynchronization at the same time, and therefore a more efficient solution is provided.

The embodiments herein may be used to achieve a more precise synchronization based on any existing signals. The embodiments herein are able to determine the clock asynchronization independent from any timestamps such as PTP timestamps.

The method estimates a relative phase offset or a relative frequency offset between the first and the second clock, as will be described in more detail below.

Next, the apparatus may obtain a transmission timestamp $t_1$ of a signal, in the sequence of signals. The transmission timestamp is in accordance with the second clock, and may also be referred to as a signal transmission timestamp. The transmission timestamp is an indication of a time when a corresponding signal, in the sequence of signals, is sent by the second node N2.

Action S221. The transmission timestamp of the signal, in the sequence of signals, may be carried in the signal itself. In this case the apparatus may obtain the transmission timestamp from the signal.

Action S223. Additionally or alternatively, the apparatus may receive schedule information carried in another signal or message, different from the sequence of signals, prior to receiving the sequence of signals. The schedule information is associated to at least one transmission timestamp. For instance, the schedule information may comprise the transmission timestamps informing the first node N1 of the time when some or all signals, in the sequence of signals, are sent by the second node N2.

Action S225. Following the action S223, the apparatus may obtain the transmission timestamp for each signal, in the sequence of signals, from the received schedule information.

Additionally, the apparatus may also obtain the corresponding receiving timestamp $t_2$ of the signal. Each receiving timestamp, which may also referred to as a signal receiving timestamp, is an indication of a time of a clock edge of the first clock after the corresponding signal, in the sequence of signals, is received by the first node N1. The clock edge is the Nth clock edge of the first clock following after the earliest clock edge of the first clock which does not precede a receipt of the corresponding signal by the first node N1, wherein N is a positive integer.

The actions S221-S225 may be performed when the apparatus is the first node N1. In this case, the first node N1 may also obtain the corresponding receiving timestamp in accordance with the first clock of the signal, which is locally stored in the first node N1.

Alternatively, when the apparatus is a third node, it may obtain the transmission timestamp from the second node N2, and obtain the receiving timestamp of the signal from the first node N1 via any other signals.

Action S230. When the transmission timestamp in accordance with the second clock and a respective receiving timestamp in accordance with the first clock have been acquired, the apparatus may measure a time difference $t_2-t_1$ between the two timestamps for the signal.

The measuring of the sequence of time differences may be performed at a certain rate. The rate of the measuring may be configured based on a frequency difference between the first clock and the second clock. For instance, the rate of measuring may be at least twice as the frequency difference between the first and second clocks. A number M of time differences in the sequence depends on a sampling window length and the rate of the measuring. For instance, a sampling window of 10 seconds with a measuring rate of 128 samples/sec will generate 1280 time differences during that sampling window.

Since there will be a time difference for each sent signal, in the sequence of signals, a corresponding sequence of time differences, will be obtained.

Action S240. The apparatus estimates at least one of a relative phase offset or a relative frequency offset between the first clock and the second clock based on the measured sequence of time differences.

The term "relative phase offset" may also be referred to as a relative clock phase offset. It is a time difference between a time of arrival of a first arrived signal in the sequence of signals, i.e., the signal 1, and an immediate next clock edge. The term "first arrived signal" refers to the signal arriving the earliest at the first node N1, after the time point of measuring the sequence of signals started in the action S230. By estimating the relative clock phase offset, a more precise synchronization of the first node to the second node is enabled.

Similarly, the term relative frequency offset may also be referred to as a relative clock frequency offset. It is a frequency difference between the frequency of the first clock and the frequency of the second clock at the time point of measuring the sequence of signals in the action S230.

Action S250. The apparatus may adjust at least one of the first clock or the second clock, based on at least one of the estimated relative phase offset or the relative frequency offset, to synchronize the first and the second clocks. Alternatively or additionally, the apparatus may calculate, based on at least one of the estimated relative phase offset or the estimated relative frequency offset, correction values that can be used correct subsequent timestamps made according to the first and/or the second clock.

Though normally it is the first node N1 that synchronizes its clock with the clock used by the second node N2, however sometimes the synchronization is also performed in dual-direction, i.e. the second node N2 synchronizes its clock to the clock used by the first node N1. Therefore the apparatus here may also adjust the second clock sometimes.

Due to the estimating of the relative clock phase and/or frequency offset only requires signals sent by the second node and received by the first node, instead of any additional responses to the second node, low bandwidth for determining the clock synchronization is needed. Additionally the embodiments here are applicable to any signals, not limited to any specific protocol, therefore the embodiments are compatible to any existing system. The embodiments herein do not require any additional hardware, e.g., specialized phase detection hardware, and do not depend on any specialized physical layer. As a result, the operations and actions described herein are applicable to various use cases, such as nodes in wireless communication network, nodes in one-way PTP mode, nodes in two-way PTP mode, nodes in SyncE, positioning nodes or IoT nodes. Alleviating usage of specialized hardware for timestamping, a lower cost is also achieved.

Figure 3:
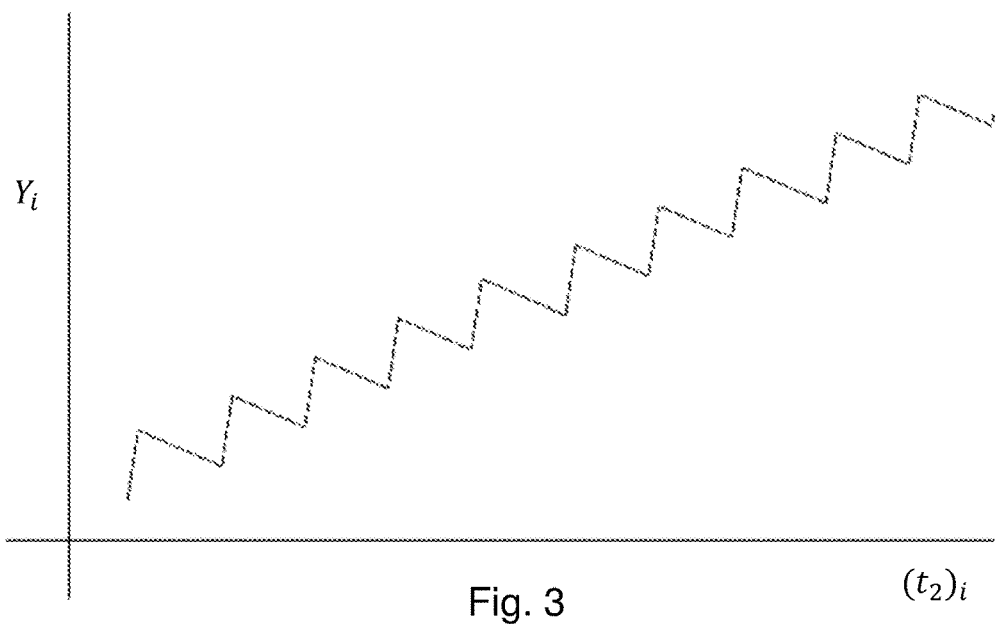
FIG. 3 illustrates an example sawtooth waveform generated by a sequence of time differences.

The sequence of time differences, as measured in the action S230, plotted against continuous time may follow a sawtooth waveform, as show in FIG. 3. Next, we will analyze the time differences in detail, to illustrate the sawtooth character of the waveform.

Figure 4:
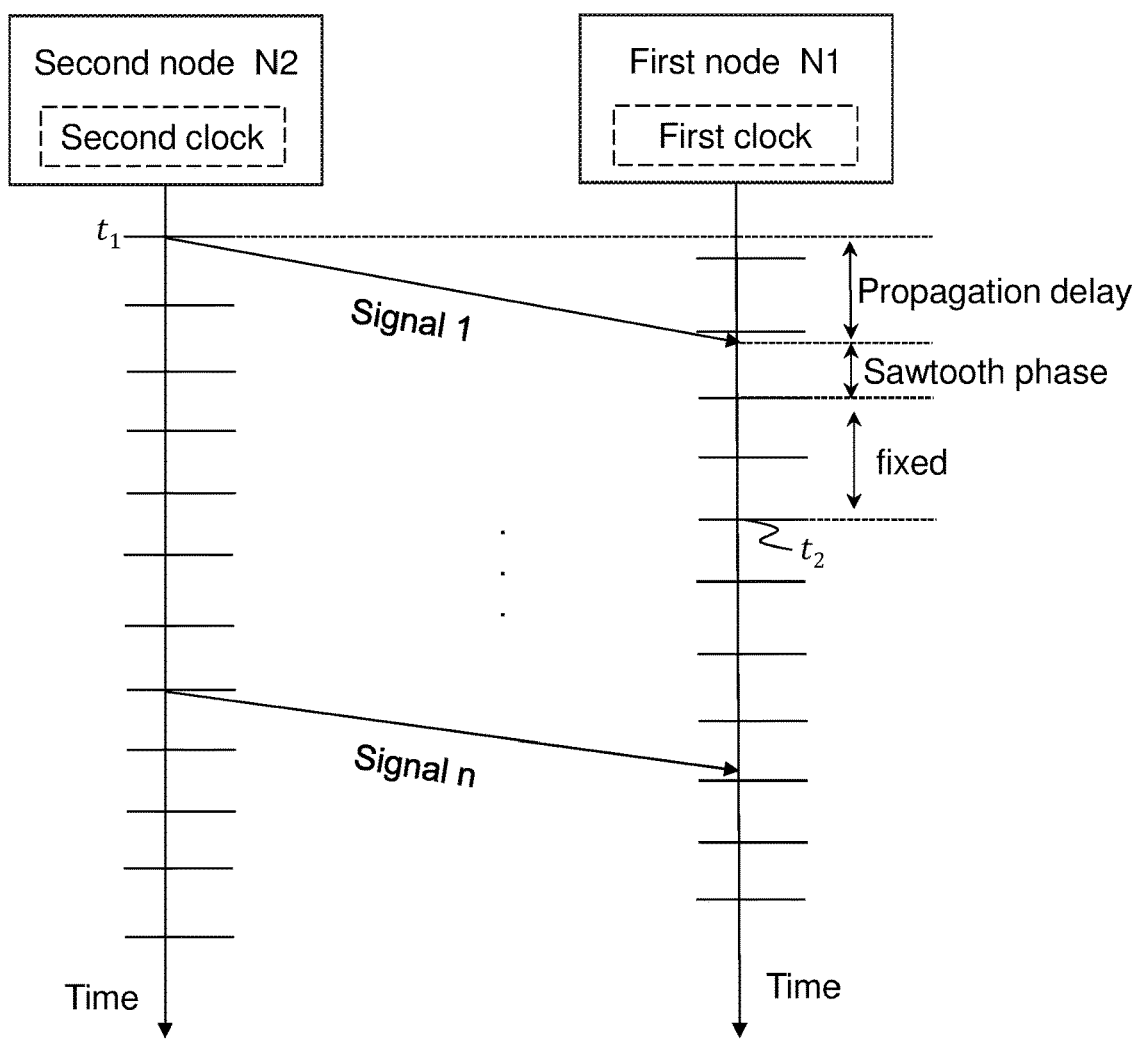
FIG. 4 illustrates a measured time difference associated to a signal 1 between first and second nodes according to further embodiments herein.

FIG. 4 illustrates an example of the time difference associated to a signal 1 between the first and second nodes N1, N2 according to embodiments herein. The signal 1 may refer to the first signal in the sequence of signals although the same procedure can be repeated for any signal in the sequence. The measured time difference corresponding to the ith signal ($1 \leq i \leq M$), in the sequence of signals, is here denoted $Y_i$ ($=(t_2-t_1)_i$), in the absence of any noise at the first node N1 may it alternatively be expressed as:

$$Y_i = (t_1)_i * \frac{(f_1 - f_2)}{f_2} + \text{offset} + \text{propagation delay} + \text{sawtooth\_phase}_i + \text{fixed} \quad (1)$$

Where:
i) $f_1$ is a frequency of the first clock, $f_2$ is a frequency of the second clock. More precisely, the frequencies $f_1$ and $f_2$ are at the first receiving timestamp $(t_2)_1$. Due to the frequencies change very slow over time, for the sake of simplicity, the frequencies $f_1$ and $f_2$ at the first receiving timestamp $(t_2)_1$ are used during the whole sampling window. The transmission timestamp $(t_1)_i$ is a time when the second node N2 sends the ith signal, for example the signal 1, which is recorded in accordance with the second clock. The first term provides the slope to the sawtooth waveform as shown FIG. 3. It will be a positive slope if $f_1 > f_2$, or alternatively a negative slope if $f_1 < f_2$.

ii) offset (not shown) is a coarse time difference between the first node N1 and the second node N2. The coarse time difference is the difference between the time readings of the two clocks at any given time with the resolution limited by the inverse of clock frequencies of the individual clocks.

iii) propagation delay is a time duration that the signal 1 travels from the second node N2 to the first node N1. This is assumed to be fixed and unknown.

iv) sawtooth_phase$_i$ may also be called remainder, e.g., in the Ref [1]. It is a time duration between a time point when the ith signal, in this case the signal 1, is received at the first node N1 and an immediate next clock edge of the first clock. The sawtooth_phase$_i$ varies along time and is within a range [0, 1/$f_1$). The open endpoint of this range is equal in value to one period of the of the first clock. A period is as usual a duration of one cycle of the clock. The sawtooth_phase$_i$ is the term that is responsible for the sawtooth character of the waveform depicted in FIG. 3. A theoretical expression for the sawtooth waveform will be provided later.

v) The term "fixed" in equation (1) may also be referred to as a fixed clock cycle delay. It is a time duration between a clock edge of the first clock immediate next to the receiving of the signal 1 and a clock edge of the first clock that the receiving of the signal 1 is timestamped. The time point that the receiving of the signal 1 is timestamped by the first node N1 is called the receiving timestamp $(t_2)_1$, which is recorded in accordance with the first clock. The fixed is assumed to be an integer multiple of $1/f_1$, i.e. an integer multiple of the period of the first clock. The fixed is a configurable delay introduced at the first node N1. That is, fixed is a known quantity here.

In summary, the first and the fourth terms in the above equation (1) are time dependent. The rest of the terms are constant, and fixed is known. The fourth term produces the sawtooth character of the waveform, and the first term determines the slope of the waveform.

Figure 5:
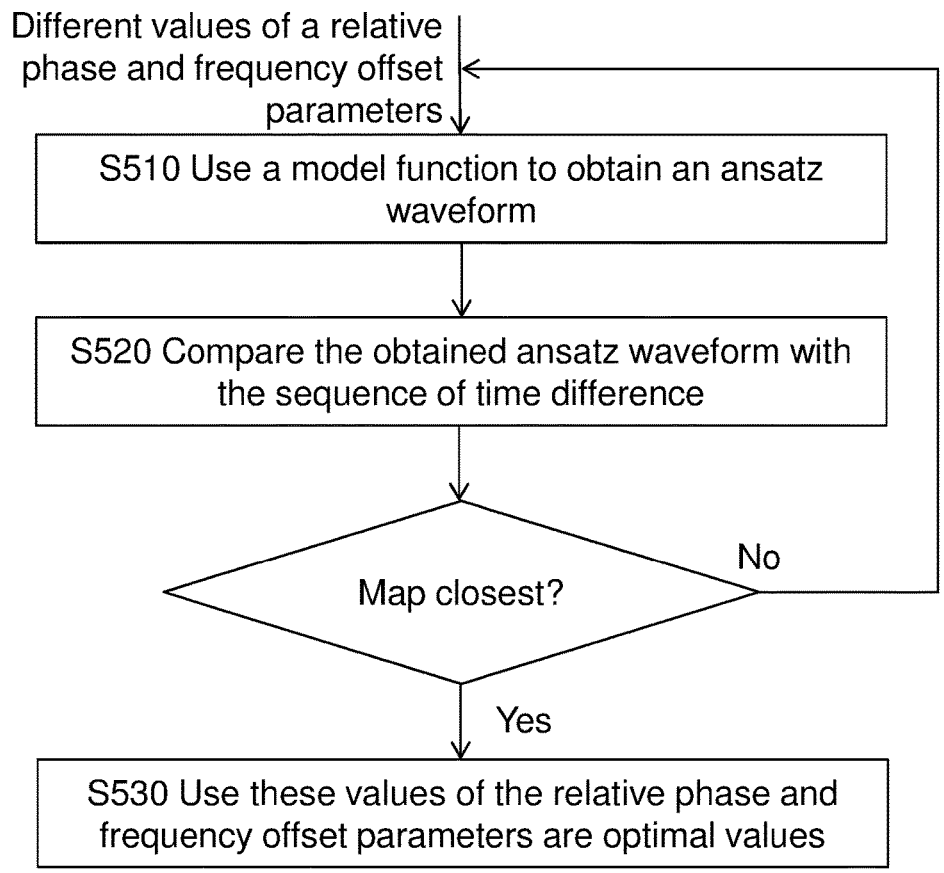
FIG. 5 is a flowchart depicting actions that may be performed by an apparatus for estimating a relative phase and frequency offsets according to further embodiments herein.

The skilled person will appreciate that there are various ways to implement the action S240. For instance, according to the Ref [1], the relative clock phase offset together with other parameters may be estimated by using any one of function (8), function (11), and the second function on page 2383, right column of Ref [1]. A non-limiting possible way of performing this estimation will now be explained with reference to FIG. 5.

The apparatus may use (S510) a model function h to obtain an ansatz waveform by providing the model function h with input values of parameters x, which comprise a relative phase offset parameter and a relative frequency offset parameter. A specific ansatz waveform h(x) that the model function h provides when given specific input values of the vector x, comprises elements $h(x)=(h(x)_1, \ldots, h(x)_M)$, where $h(x)_i$ represents the ith value, i.e., the ith element corresponding to the ith signal on the concrete ansatz waveform. The input values are different every time when the action S510 is performed, they may be initialized as any random values at the beginning. The obtained ansatz waveform h(x) changes its altitude and frequency along with different input values of x provided to the model function h. The model function may also be referred to as a ramped-sawtooth signal model, or a signal model as in Ref [1].

The model function h may in exemplary embodiments be defined by:

$$h(x)_i = (t_1)_i * \frac{f_d}{(f_1 - f_d)} + \text{offset} + \text{propagation delay} + \quad (2)$$
$$\frac{1}{2\pi(f_1 - f_d)} \text{mod}_{2\pi}(2\pi f_d(t_2)_i + \emptyset) + \text{fixed} + \text{noise}$$

Where:
parameters $x=(f_d, \emptyset, \text{offset, propagation delay})$.
$\text{mod}_{2\pi}(a)$ stands for a modulo $2\pi$, that is, the remainder of a after division with $2\pi$.
In this function (2), the term $$\frac{1}{2\pi(f_1 - f_d)} \text{mod}_{2\pi}(2\pi f_d(t_2)_i + \emptyset)$$

corresponds to the sawtooth_phase$_i$ in the above function (1).

noise represents a known random zero-mean Gaussian noise, which models noises of the sequence of time differences. It is normally small and can be ignored sometimes, like in the above function (1). The noise is relevant for the measurements and not time specific.

Then the apparatus may compare (S520) the obtained ansatz waveform h(x) with the sequence of time differences Y to determine a loss term between them. A loss term is here a real value that expresses a degree of closeness between Y and h(x), that is, provides an indication of how similar Y and h(x) are. Hence the comparison is to determine how closely the obtained ansatz waveform corresponds to the sequence of time differences. Here Y $(=(Y_1, Y_2, \ldots, Y_M))$ represents the sequence of time differences measured at the action S230.

There are many ways in which the loss term could be introduced. As an example, an "objective function" O may be used. In optimization theory, an objective function is a function which is to be optimized, e.g. maximized or minimized. The objective function O is here a function that provides the loss term between Y and h(x) as function of the parameters x. The objective function may also be called a loss function or cost function, a utility function or fitness function, or, in certain fields, an energy function or energy functional. In the following we assume the convention that a smaller value of the objective function O(x) indicates a greater closeness between the Y and h(x). That is, one may aim at minimizing the value of the objective function O(x) over the input values of the parameters x. Of course, the opposite convention could equally well be used, with evident modifications.

The objective function may in exemplary embodiments be based on a metric d. A metric d on a set U is a function that provides a reasonable notion of distance between each pair of elements of the set U by requiring that it (d) satisfies the following axioms:

$$d: U \times U \rightarrow [0, \infty)$$

$$d(a,b)=0 \Leftrightarrow a=b, \forall a,b \in U$$

$$d(a,b)=d(b,a), \forall a,b \in U$$

$$d(a,c) \leq d(a,b)+d(b,c), \forall a,b,c \in U$$

In our case the set U can be seen as $R^M$, that is, the set of all M-tuples of real numbers. Having selected a suitable metric d for $R^M$, the objective function O may in exemplary embodiments be defined by O(x)=d(Y,h(x)). In other embodiments, the objective function may more generally be defined by O(x)=g(d(Y, h(x))), where g may be a real valued function which is increasing on $[0, \infty)$.

One exemplary way of providing a metric on $R^M$ is to first introduce a (vector space) norm $\|\cdot\|$ on $R^M$, e.g., an Lp norm, where $R^M$ is endowed with a vector space structure over R in the standard way. A metric d may then be defined by $d(a,b)=\|a-b\|$, $\forall a, b \in R^M$. With this in mind the objective function O may in exemplary implementation embodiments be defined by:

$$O(x)=\|Y-h(x)\| \quad (3)$$

or $$O(x)=\|Y-h(x)\|^2 \quad (4)$$

Next, the apparatus may find optimal input values $\hat{x}$ of the parameters x, in order to obtain the ansatz waveform $h(\hat{x})$ which corresponds most closely to the sequence of time differences Y. Consequently, in exemplary embodiments, the optimal input values $\hat{x}$ are such that the value of the objective function O(x) is minimized, or written more formally $$\hat{x} = \arg \min_x O(x) \quad (5)$$

The apparatus will determine whether or not an obtained ansatz waveform corresponds or maps most closely to the sequence of time differences. If yes, it is concluded that optimal input values among the different input values have been found, and the procedure will move to the action S530; otherwise go back to the action S510. As an implementation form, the action S510 will be repeated until a minima value of the objective function O(x) is hit, i.e., changing input values of the parameters x does not result in any or very little reduction in the value of the objective function O(x). Additionally or alternatively, the action S510 will be repeated until a value of the objective function O(x) smaller than a configured threshold is hit.

The established optimal input values $\hat{x}$ will comprise, in particular, an optimal value of the relative phase offset parameter $\hat{\emptyset}$ and an optimal value of the relative frequency offset parameter $\hat{f_d}$ and the apparatus may use (S530) the optimal input values of the relative phase offset parameter and the relative frequency offset parameter as the estimated relative phase offset and relative frequency offset.

Figure 6:
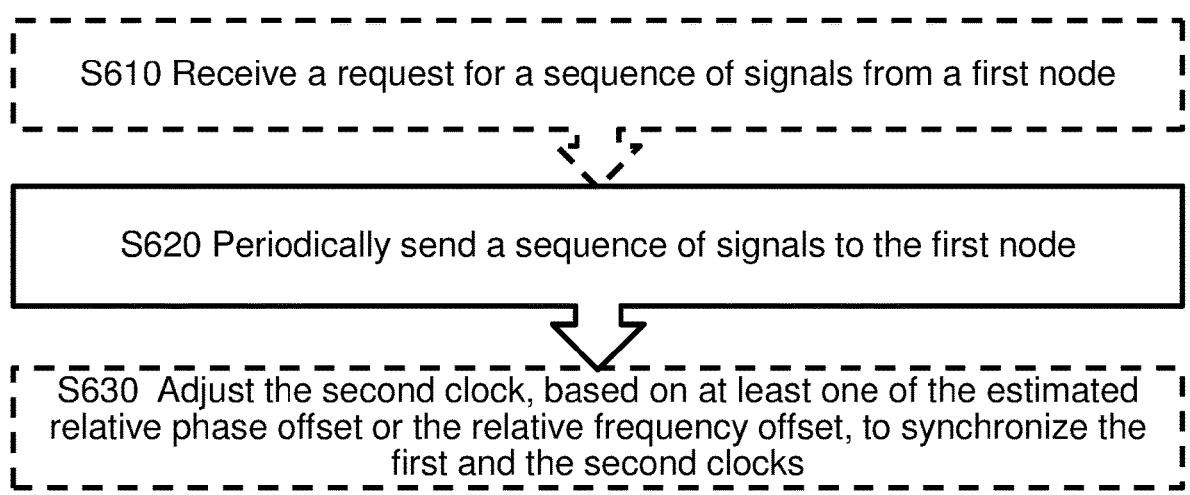
FIG. 6 is a flowchart depicting actions performed by a second node according to further embodiments herein.

Some actions performed by the second node N2 for facilitating the determination of asynchronization between the first clock used by the first node N1 and the second clock used by the second node N2 will now be described with reference to FIG. 6. The following actions may be taken in any suitable order. Actions that could be performed only in some embodiments may be marked with dashed boxes.

Action S610. The second node N2 may receive the request for the sequence of signals from the first node N1.

Action S620. Then the second node N2 periodically sends the sequence of signals to the first node N1.

Action S630. The second node N2 may further adjust the second clock, based on at least one of the estimated relative phase offset or the relative frequency offset, to synchronize the first and the second clocks.

Figure 7:
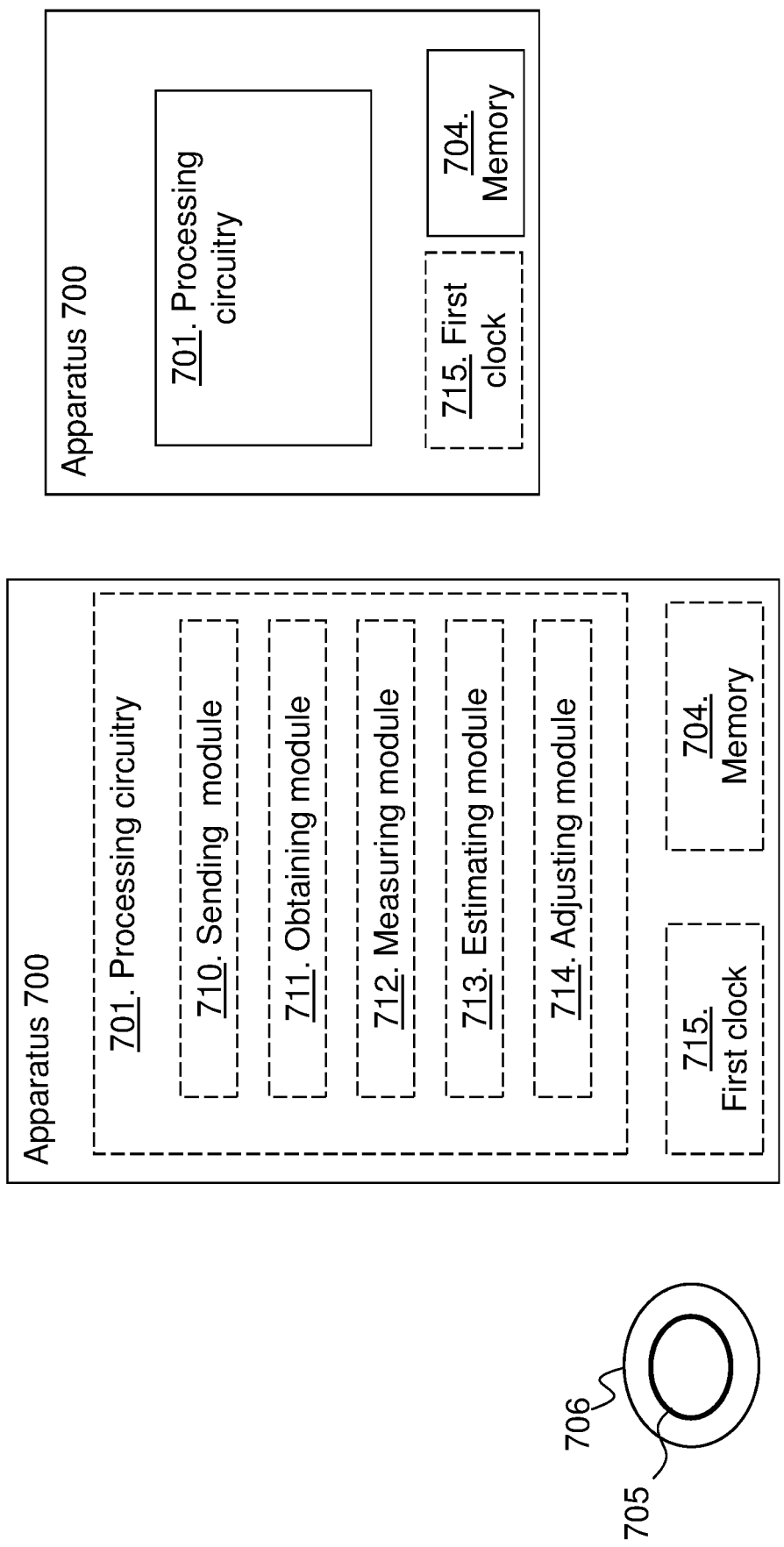
FIG. 7 is a schematic block diagram illustrating how an apparatus may be structured according to further embodiments herein.

FIG. 7 is a block diagram depicting the apparatus 700, for determining asynchronization between the first clock used by the first node and the second clock used by the second node according to embodiments herein. The apparatus 700 may be implemented in either the first node N1 or any other third node.

The apparatus 700 may comprise processing circuitry 701, e.g., one or more processors, configured to perform the operations and actions described herein.

The apparatus 700 may comprise a sending module 710, e.g., a transmitter or a transceiver. The apparatus 700, the processing circuitry 701 and/or the sending module 710 may configured to send, a request for a sequence of signals to the second node N2.

The apparatus 700 may comprise an obtaining module 711. The apparatus 700, the processing circuitry 701 and/or the obtaining module 711 may be configured to obtain the transmission timestamps either from a corresponding signal in the sequence of signals, or from the schedule information.

The apparatus 700 may comprise a measuring module 712. The apparatus 700, the processing circuitry 701 and/or the measuring module 712 is configured to measure the sequence of time differences based on the sequence of signals periodically sent by the second node and received by the first node. Each time difference of the signal is between the respective transmission timestamp in accordance with the second clock and the respective receiving timestamp in accordance with the first clock.

The apparatus 700 may comprise an estimating module 713. The apparatus 700, the processing circuitry 701 and/or the estimating module 713 is configured to estimate at least one of the relative phase offset or the relative frequency offset between the first and the second clock based on the sequence of time differences.

The apparatus 700 may comprise an adjusting module 714. The apparatus 700, the processing circuitry 701 and/or the adjusting module 714 may be configured to adjust at least one of the first clock or the second clock, based on at least one of the estimated relative phase offset or the relative frequency offset, to synchronize the first and the second clocks.

As mentioned above, the apparatus 700 may further comprise the first clock 715.

The apparatus 700 may further comprise a memory 704. The memory comprises one or more units to be used to store data on, such as the requests, the responses, and/or the related parameters to perform the operations and actions disclosed herein when being executed. Thus, the apparatus 700 may comprise the processing circuitry 701 and the memory 704, said memory 704 comprising instructions executable by said processing circuitry 701 whereby said radio network node is operative to perform the methods herein.

The operations and actions according to the embodiments described herein for the apparatus 700 are respectively implemented by means of e.g., a computer program product 705 or a computer program 705, comprising instructions, i.e., software code portions, which, when executed on at least one processor, cause the at least one processor to carry out the actions described herein, as performed by the apparatus 700. The computer program product 705 may be stored on a computer-readable storage medium 706, e.g., a disc or similar. The computer-readable storage medium 706, having stored thereon the computer program product 705, may comprise the instructions which, when executed on at least one processor, cause the at least one processor to carry out the actions described herein, as performed by the apparatus 700. In some embodiments, the computer-readable storage medium may be a non-transitory computer-readable storage medium.

Figure 8:
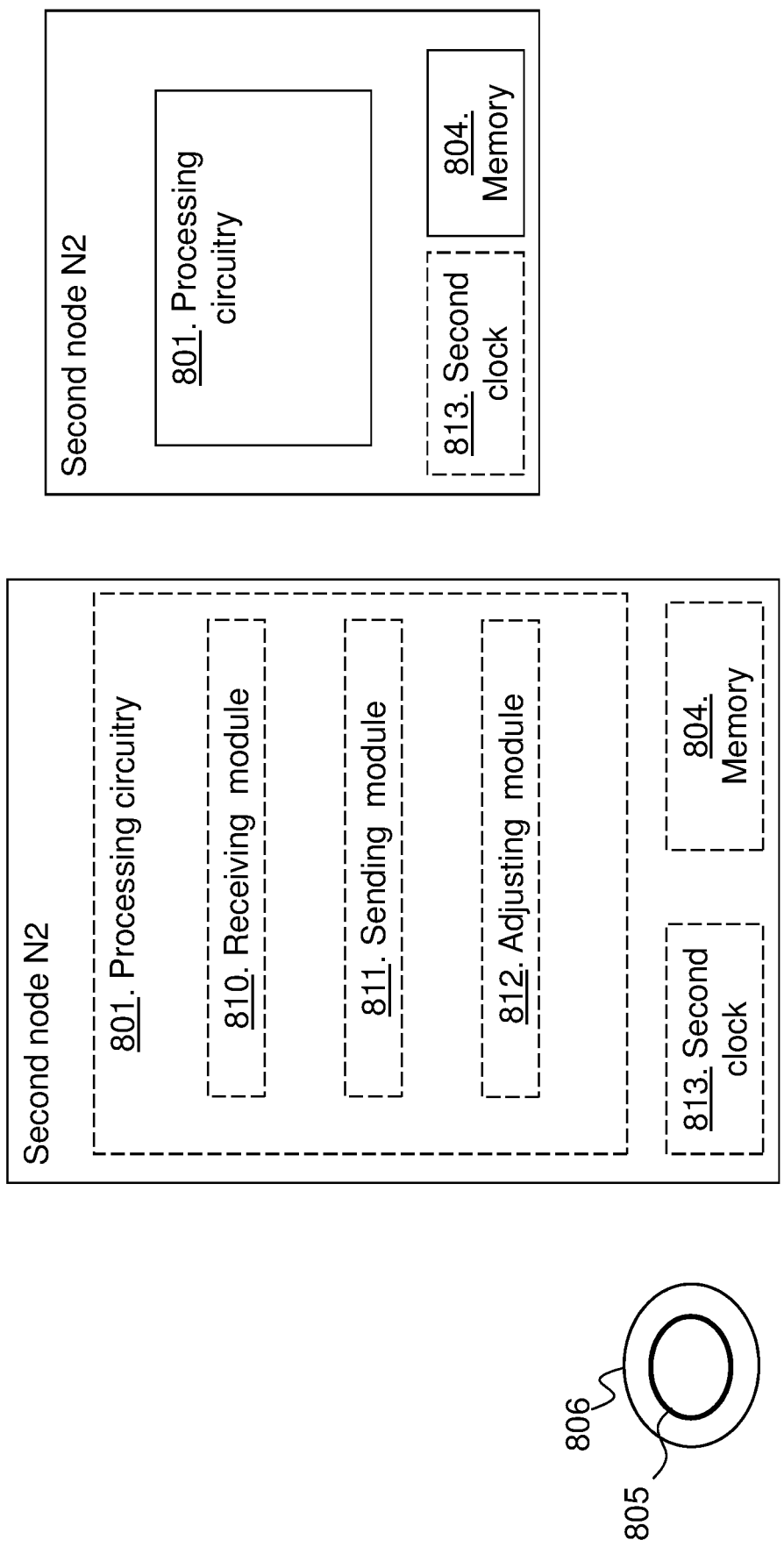
FIG. 8 is a schematic block diagram illustrating how a second node may be structured according to further embodiments herein.

FIG. 8 is a block diagram depicting the second node N2, for facilitating the determination of asynchronization between the first clock used by the first node N1 and the second clock N2 used by the second node according to embodiments herein.

The second node N2 may comprise processing circuitry 801, e.g., one or more processors, configured to perform the operations and actions described herein for the second node N2.

The second node N2 may comprise a receiving module 810, e.g., a receiver or a transceiver. The second node N2, the processing circuitry 801 and/or the receiving module 810 may be configured to receive the request for the sequence of signals from the first node.

The second node N2 may comprise a sending module 811, e.g., a transmitter or a transceiver. The second node N2, the processing circuitry 801 and/or the sending module 811 is configured to periodically send the sequence of signals to the first node, to facilitate the first node to measure the sequence of time differences based on the sequence of signals, wherein each time difference of the signal is between the respective transmission timestamp in accordance with the second clock and the respective receiving timestamp in accordance with the first clock; and to facilitate the first node to estimate at least one of the relative phase offset or the relative frequency offset between the first and the second clock based on the sequence of time differences.

The second node N2 may comprise an adjusting module 812. The second node N2, the processing circuitry 801 and/or the adjusting module 812 may be configured to adjust the second clock, based on at least one of the estimated relative phase offset or the relative frequency offset, to synchronize the first and the second clocks.

The second node N2 may further comprise the second clock 813.

The second node N2 may further comprise a memory 804. The memory comprises one or more units to be used to store data on, such as the requests, the responses, and/or the related parameters to perform the operations and actions disclosed herein when being executed. Thus, the second node N2 may comprise the processing circuitry 801 and the memory 804, said memory 804 comprising instructions executable by said processing circuitry 801 whereby said radio network node is operative to perform the operations and actions herein.

The operations and actions according to the embodiments described herein for the second node N2 are respectively implemented by means of e.g., a computer program product 805 or a computer program 805, comprising instructions, i.e., software code portions, which, when executed on at least one processor, cause the at least one processor to carry out the actions described herein, as performed by the second node N2. The computer program product 805 may be stored on a computer-readable storage medium 806, e.g., a disc or similar. The computer-readable storage medium 806, having stored thereon the computer program product 805, may comprise the instructions which, when executed on at least one processor, cause the at least one processor to carry out the actions described herein, as performed by the second node N2. In some embodiments, the computer-readable storage medium may be a non-transitory computer-readable storage medium.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a radio network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of radio network nodes will appreciate the cost, performance, and maintenance trade-offs inherent in these design choices. When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method for determining asynchronization between a first clock used by a first node and a second clock used by a second node, the method comprising:
    measuring a sequence of time differences based on a sequence of signals periodically sent by the second node and received by the first node, each time difference of a signal being between a respective transmission timestamp in accordance with the second clock and a respective receiving timestamp in accordance with the first clock; and
    estimating at least one of a relative phase offset and a relative frequency offset between the first and the second clock based on the sequence of time differences, the estimating comprising:
        using a model function to obtain ansatz waveforms by providing the model function with different input values of a relative phase offset parameter and a relative frequency offset parameter;
        using an objective function to determine optimal input values among the different input values, wherein the ansatz waveform obtained with the optimal input values corresponds most closely to the sequence of time differences; and
        using the optimal input values of the relative phase offset parameter and the relative frequency offset parameter as the estimated relative phase offset and relative frequency offset.

2. The method according to claim 1, wherein the signals are broadcast signals.

3. The method according to claim 1, wherein the method further comprises:
    obtaining at least one of the transmission timestamps from a corresponding signal in the sequence of signals.

4. The method according to claim 1, wherein the method further comprises:
    obtaining at least one of the transmission timestamps from schedule information.

5. The method according to claim 1, wherein the method further comprises:
    adjusting at least one of the first clock and the second clock, based on at least one of the estimated relative phase offset and the relative frequency offset, to synchronize the first and the second clocks.

6. The method according to claim 1, wherein the objective function is a metric.

7. The method according to claim 1, wherein the objective function is based on a norm of a difference between the sequence of time differences and an obtained ansatz waveform.

8. The method according to claim 7, wherein the norm is an Lp norm.

9. A method for facilitating a determination of asynchronization between a first clock used by a first node and a second clock used by a second node, the method comprising:
    periodically sending, by the second node, a sequence of signals to the first node, to facilitate the first node to measure a sequence of time differences based on a sequence of signals, each time difference of a signal being between a respective transmission timestamp in accordance with the second clock and a respective receiving timestamp in accordance with the first clock; and
    facilitating the first node to estimate at least one of a relative phase offset and a relative frequency offset between the first and the second clock based on the sequence of time differences, the estimating comprising:
        using a model function to obtain ansatz waveforms by providing the model function with different input values of a relative phase offset parameter and a relative frequency offset parameter;
        using an objective function to determine optimal input values among the different input values, wherein the ansatz waveform obtained with the optimal input values corresponds most closely to the sequence of time differences; and
        using the optimal input values of the relative phase offset parameter and the relative frequency offset parameter as the estimated relative phase offset and relative frequency offset.

10. The method according to claim 9, wherein the signals are broadcast signals.

11. The method according to claim 9, wherein at least one of the transmission timestamps is comprised in a corresponding signal in the sequence of signals.

12. The method according to claim 9, wherein the method further comprises sending schedule information of at least one of the transmission timestamps.

13. An apparatus comprising processing circuitry configured to:
    measure a sequence of time differences based on a sequence of signals periodically sent by a second node and received by a first node, each time difference of a signal being between a respective transmission timestamp in accordance with the second clock and a respective receiving timestamp in accordance with the first clock; and estimate at least one of a relative phase offset and a relative frequency offset between the first and the second clock based on the sequence of time differences, the estimating comprising:

using a model function to obtain ansatz waveforms by providing the model function with different input values of a relative phase offset parameter and a relative frequency offset parameter;

using an objective function to determine optimal input values among the different input values, wherein the ansatz waveform obtained with the optimal input values corresponds most closely to the sequence of time differences; and using the optimal input values of the relative phase offset parameter and the relative frequency offset parameter as the estimated relative phase offset and relative frequency offset.

14. A second node comprising processing circuitry configured to:

periodically send a sequence of signals to the first node, to facilitate the first node to measure a sequence of time differences based on a sequence of signals, each time difference of a signal being between a respective transmission timestamp in accordance with the second clock and a respective receiving timestamp in accordance with the first clock; and facilitate the first node to estimate at least one of a relative phase offset and a relative frequency offset between the first and the second clock based on the sequence of time differences, the estimating comprising:

using a model function to obtain ansatz waveforms by providing the model function with different input values of a relative phase offset parameter and a relative frequency offset parameter;

using an objective function to determine optimal input values among the different input values, wherein the ansatz waveform obtained with the optimal input values corresponds most closely to the sequence of time differences; and using the optimal input values of the relative phase offset parameter and the relative frequency offset parameter as the estimated relative phase offset and relative frequency offset.

\* \* \* \* \*